US012771968B2

(12) United States Patent
Yang et al.

(10) Patent No.: US 12,771,968 B2
(45) Date of Patent: Oct. 20, 2026

(54) SENSOR CIRCUIT WITH NOISE ELIMINATION

(71) Applicant: Sitronix Technology Corporation, Hsinchu County (TW)

(72) Inventors: Chen-Yuan Yang, Hsinchu County (TW); Tsun-Sen Lin, Hsinchu County (TW); Hung-Yen Tai, Hsinchu County (TW); Ming-Lung Hsu, Hsinchu County (TW)

(73) Assignee: SITRONIX TECHNOLOGY CORPORATION, Hsinchu County (TW)

( * ) Notice: Subject to any disclaimer, the term of this patent is extended or adjusted under 35 U.S.C. 154(b) by 72 days.

(21) Appl. No.: 18/582,707

(22) Filed: Feb. 21, 2024

(65) Prior Publication Data

US 2024/0284063 A1 Aug. 22, 2024

Related U.S. Application Data

(60) Provisional application No. 63/447,177, filed on Feb. 21, 2023.

(51) Int. Cl.
*H04N 25/78* (2023.01)
*H04N 25/616* (2023.01)

(52) U.S. Cl.
CPC ........... *H04N 25/78* (2023.01); *H04N 25/616* (2023.01)

(58) Field of Classification Search
CPC ....... H04N 25/616; H04N 25/75; H04N 25/78
See application file for complete search history.

(56) References Cited

U.S. PATENT DOCUMENTS

2014/0078360 A1* 3/2014 Park ........................ H04N 25/57 348/294
2016/0239721 A1* 8/2016 Bitton ................... G01J 1/4204
2024/0244345 A1* 7/2024 Park ...................... H04N 25/617

FOREIGN PATENT DOCUMENTS

TW 201220836 A 5/2012
TW 202126028 A 7/2021

OTHER PUBLICATIONS

Taiwan Intellectual Property Office, First Office Action Search Report on Jun. 27, 2024.

* cited by examiner

*Primary Examiner* — Daniel M Pasiewicz
(74) *Attorney, Agent, or Firm* — WPAT, PC

(57) ABSTRACT

The present invention provides a sensor circuit with noise elimination comprising: a reference circuit which receives plural first sensing signals and generates a ramp signal based on the first sensing signal; and a comparison circuit which is coupled to the reference circuit, and which receives a second sensing signal and a ramp signal and generates a count signal based on the ramp signal and the second sensing signal and records the count signal at the time when the ramp signal is equal to the second sensing signal, thereby eliminating the noise of the second sensing signal to obtain a noise-free sensing value. The count signal is recorded when the ramp signal and the second sense signal are equal, so that the noise of the second sense signal is eliminated and a noise-free sense value is obtained.

14 Claims, 15 Drawing Sheets

1

SENSOR CIRCUIT WITH NOISE ELIMINATION

FIELD OF INVENTION

The present invention relates to a sensing circuit having the capability of eliminating noise, in particular, a sensing circuit eliminating environmental noise and component deviation.

BACKGROUND OF THE INVENTION

Correlated double sampling is a method of measuring electrical values such as voltage or current for eliminating unnecessary offsets. It is often used when measuring sensor output. The sensor output is measured twice: one under known conditions and the other under unknown conditions. The value measured under known conditions is then subtracted from the one measured under unknown conditions to produce a value with a known relationship to the measured physical quantity.

When correlated double sampling is applied to a sensing panel, the offset values produced by pixels on the same column during fabrication are usually eliminated by subtracting the sensing values obtained at different times. Then, the sensing information without offset value is obtained.

It can be seen from the above that currently, when using correlated double sampling to remove noise, the sensing values obtained by pixels on the same column on the sensing panel are subtracted at different times. Since the noise provided by the environment at different times is different, it is not possible to remove the noise provided by the environment perfectly. It can only remove non-environmental noise through correlated double sampling, namely, the offset value generated by pixels during fabrication.

Accordingly, how to eliminate the offset value generated by pixels during fabrication and the noise generated by the environment has become a challenge faced by those skilled in the art.

SUMMARY OF THE INVENTION

An objective of the present invention is to provide a sensor circuit capable of eliminating sensing offsets caused by pixel defects formed by fabrication and sensing errors caused by the environment. Fully covered pixel structures are used to provide the sensing errors caused by the environment. In addition, fully covered and uncovered pixel structures are disposed on the same row or column for providing the sensing offsets caused by pixel defects formed by fabrication. Thereby, the sensing errors and sensing offsets can be eliminated.

To achieve the above objective, the present invention provides a sensor circuit with noise elimination, which comprises a reference circuit and a comparison circuit. The reference circuit receives a plurality of first sensing signals and generates a ramp signal according to the plurality of first sensing signals. The comparison circuit is coupled to the reference circuit and receives a second sensing signal and the ramp signal. It then generates a count signal according to the ramp signal and the second sensing signal. When the ramp signal and the second sensing signal are equal, the count signal is recorded for eliminating the sensing offsets caused by pixel defects formed by fabrication and the sensing errors caused by the environment.

According to an embodiment of the present invention, the reference circuit includes an averaging circuit, a first sample-and-hold circuit, and a ramp generation circuit. The averaging circuit receives and averages the plurality of first sensing signals for generating an average signal. The first sample-and-hold circuit is coupled to the averaging circuit and samples the average signal for generating a sampled average signal. The ramp generation circuit is coupled to the first sample-and-hold circuit and generates the ramp signal according to the sampled average signal.

According to an embodiment of the present invention, the reference circuit includes a selection circuit, a first sample-and-hold circuit, and a ramp generation circuit. The selection circuit receives and selects the plurality of first sensing signals for generating a selection signal. The first sample-and-hold circuit is coupled to the selection circuit and samples the selection signal for generating a sampled selection signal. The ramp generation circuit is coupled to the first sample-and-hold circuit and generates the ramp signal according to the sampled selection signal.

According to an embodiment of the present invention, the comparison circuit includes a comparator, a counter, and a data latch circuit. The comparison circuit is used for comparing the ramp signal and the second sensing signal. The counter generates a count signal corresponding to the ramp signal. The data latch circuit is coupled to the comparator and the counter, and records the count signal when the comparator judges that the ramp signal is equal to the second sensing signal.

According to an embodiment of the present invention, the sensor circuit with noise elimination further comprises a sensing module and a plurality of noise sensing modules. The sensing module is coupled to the comparison circuit and senses a light signal and ambient light for generating the second sensing signal. The plurality of noise sensing modules are disposed on one or more side of the sensing module and coupled to the reference circuit. They sense the ambient light for generating the plurality of first sensing signals.

According to an embodiment of the present invention, the comparison circuit further includes a gain circuit and a second sample-and-hold circuit. The gain circuit is coupled to the sensing module and amplifies the power of the second sensing signal. The second sample-and-hold circuit is coupled to the gain circuit, samples and holds the second sensing signal, and transmits the second sensing signal to the comparator.

According to an embodiment of the present invention, the plurality of noise sensing modules are disposed on two adjacent sides of the sensing module.

According to an embodiment of the present invention, the plurality of noise sensing modules are disposed on two opposing sides of the sensing module.

According to an embodiment of the present invention, the sensing module further includes a plurality of pixel structures with each pixel structure including a transistor.

According to an embodiment of the present invention, the sensing module and the plurality of noise sensing modules are coupled to a driving circuit, respectively. The driving circuit generates a driving signal for controlling the sensing module and the plurality of noise sensing modules to perform sensing.

Accordingly, how to provide a sensor circuit with noise elimination has become a challenge faced by those skilled in the art.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

Figure 1A:
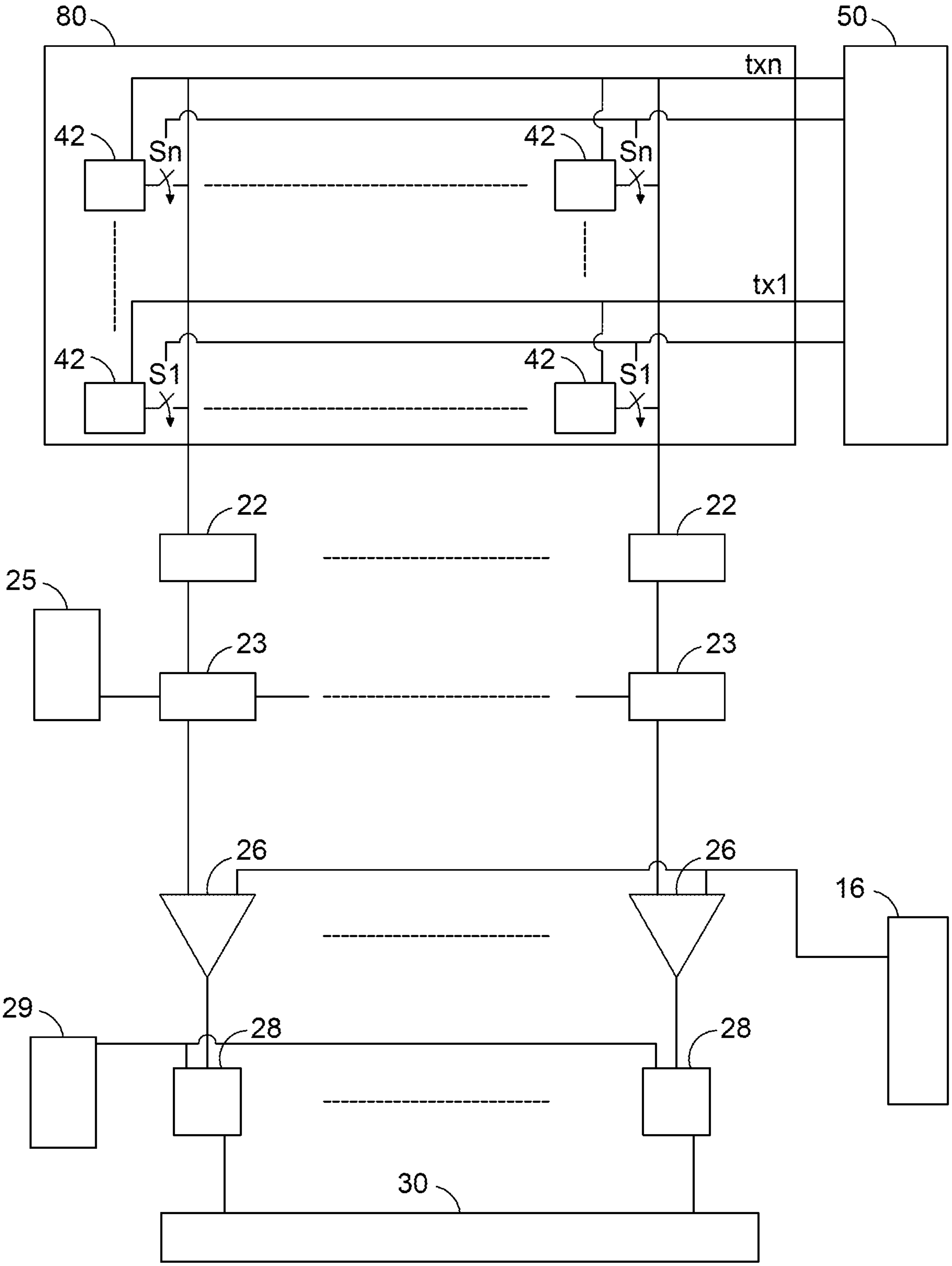
FIG. 1A shows a schematic diagram of the sensor circuit according to the prior art.
Figure 1B:
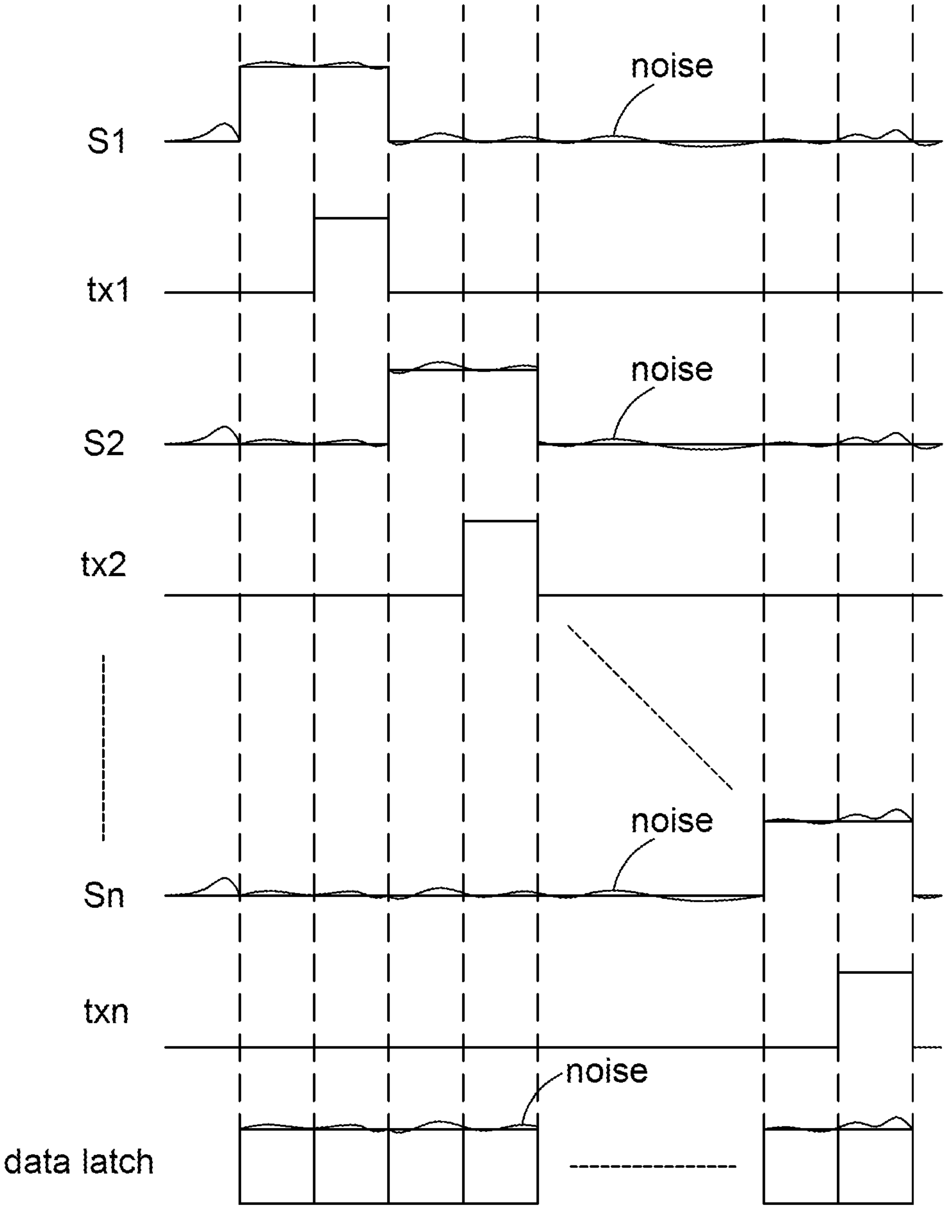
FIG. 1B shows a schematic diagram of the signals in the sensor circuit according to the prior art.

In the past, the sensing values sensed by a sensing panel contain many noises. To eliminate the noises in sensing values, the circuit design according to the prior art is shown as FIG. 1A. FIG. 1A shows a schematic diagram of the sensor circuit according to the prior art. As shown in the figure, a plurality of pixel structures are adopted for sensing. Next, FIG. 1B shows a schematic diagram of the signals in the sensor circuit according to the prior art. The sessor circuit according to the prior art comprises a ramp circuit 16, a plurality of buffers 22, a plurality of sampling devices 23, a sampling controller 25, a plurality of comparators 26, a plurality of data latch circuits 28, and a counter 29. In addition, a signal processing circuit 30 and a driving circuit 50 are used as well. The driving circuit 50 controls the plurality of pixel structures 42 to sample for the first time when the switches are open through a plurality of control signals tx1~txn and a plurality of driving signals S1~Sn, and to sample for the second time when the switches are closed. The first sampling can be used to obtain a sampling value that is not affected by the image exposure, and this sampling value has deviation information caused by manufacturing. Then the sampling devices 23 and the sampling controller 25 can obtain the sampling values without deviation information by calibration using the two sampling values. The plurality of comparators 26 compares the calibrated sampling values with the ramp signal of the ramp circuit 16, so that the plurality of data latch circuits 28 can latch the corresponding to counting values of the counter 29, respectively, and use them as the sensing values for the signal processing circuit 30.

In addition to the deviation information caused by manufacturing, the sensor circuit according to the prior art also has noise generated by the sensing environment and power supply. The prior art uses two sampling conditions at different time. Unfortunately, the environmental noise and power supply noise change with time. Consequently, the environmental and power supply noises cannot be effectively suppressed. Instead, the noises will accumulate after subtraction.

The present invention improves the prior art by sensing the fully covered pixel structure to obtain environmental noise and power supply noise. Through the comparison circuit, the obtained environmental noise and power supply noise are compared with the sensing values of the uncovered pixel structure for eliminating the environmental noise and power supply noise. Since both sensing values contain deviation information caused by manufacturing, the deviation information can be eliminated.

In the following description, various embodiments of the present invention are described using figures for describing the present invention in detail. Nonetheless, the concepts of the present invention can be embodied by various forms. Those embodiments are not used to limit the scope and range of the present invention.

Figure 2:
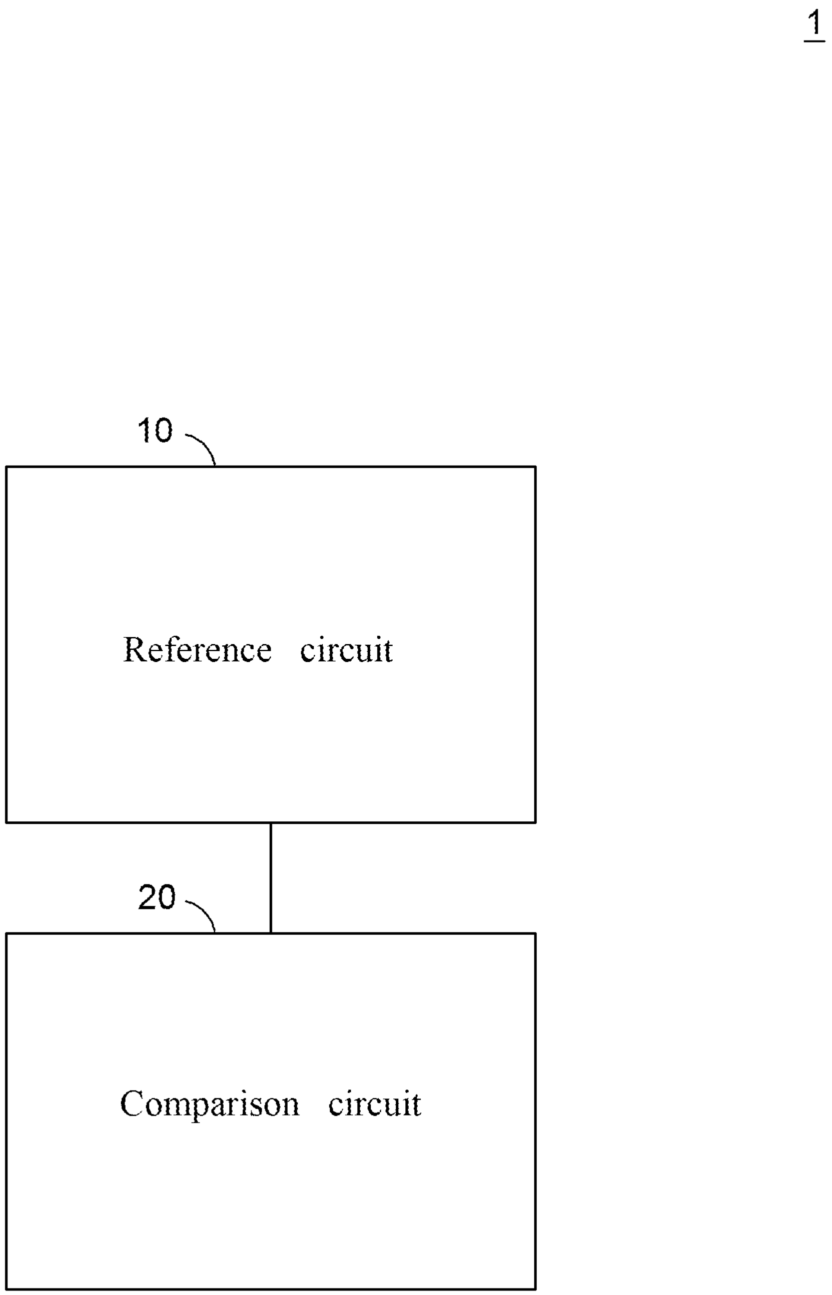
FIG. 2 shows a schematic diagram of the sensor circuit with noise elimination according to an embodiment of the present invention.
Figure 3:
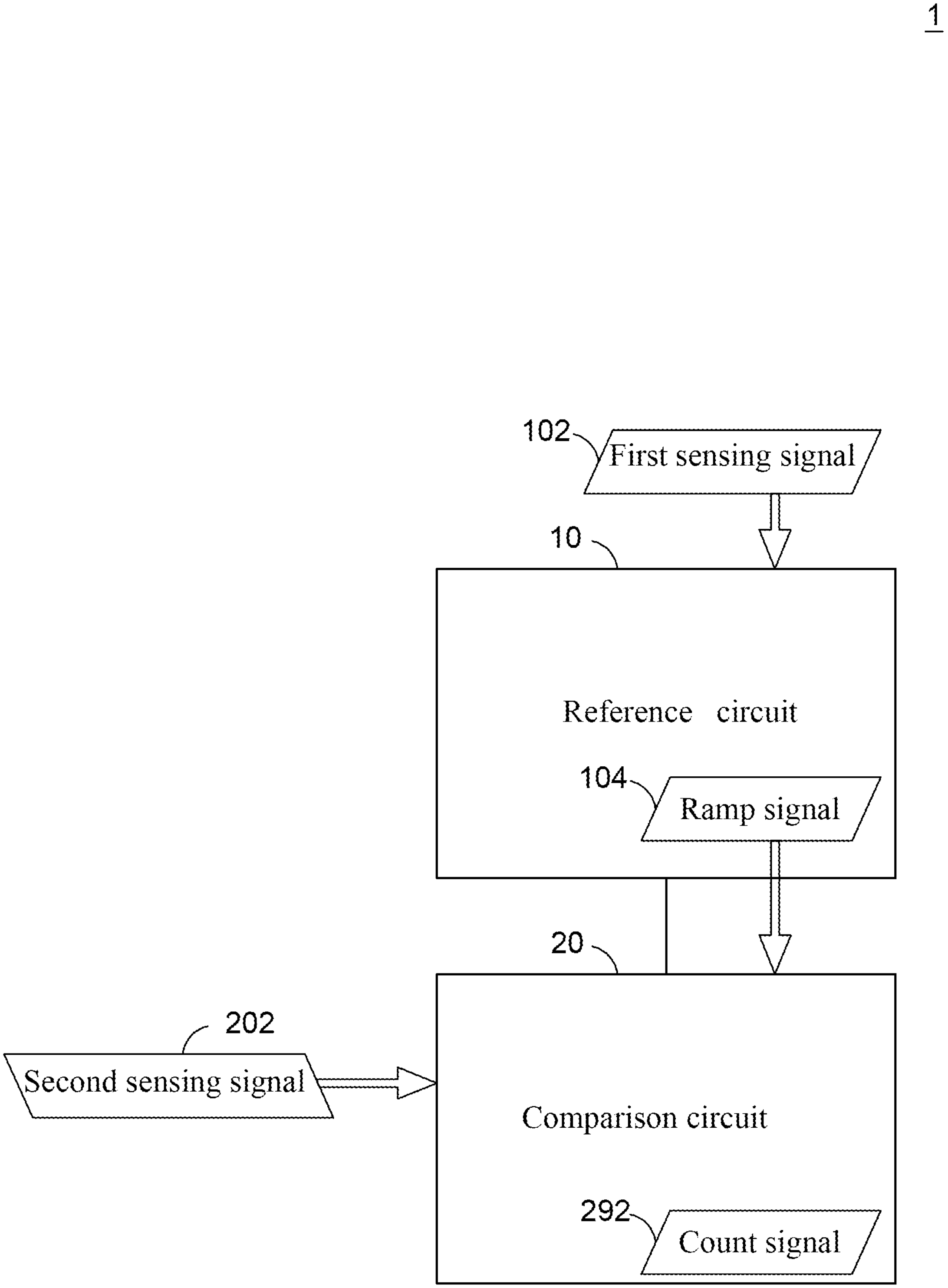
FIG. 3 shows a schematic diagram of signal transmission according to an embodiment of the present invention.
Figure 4A:
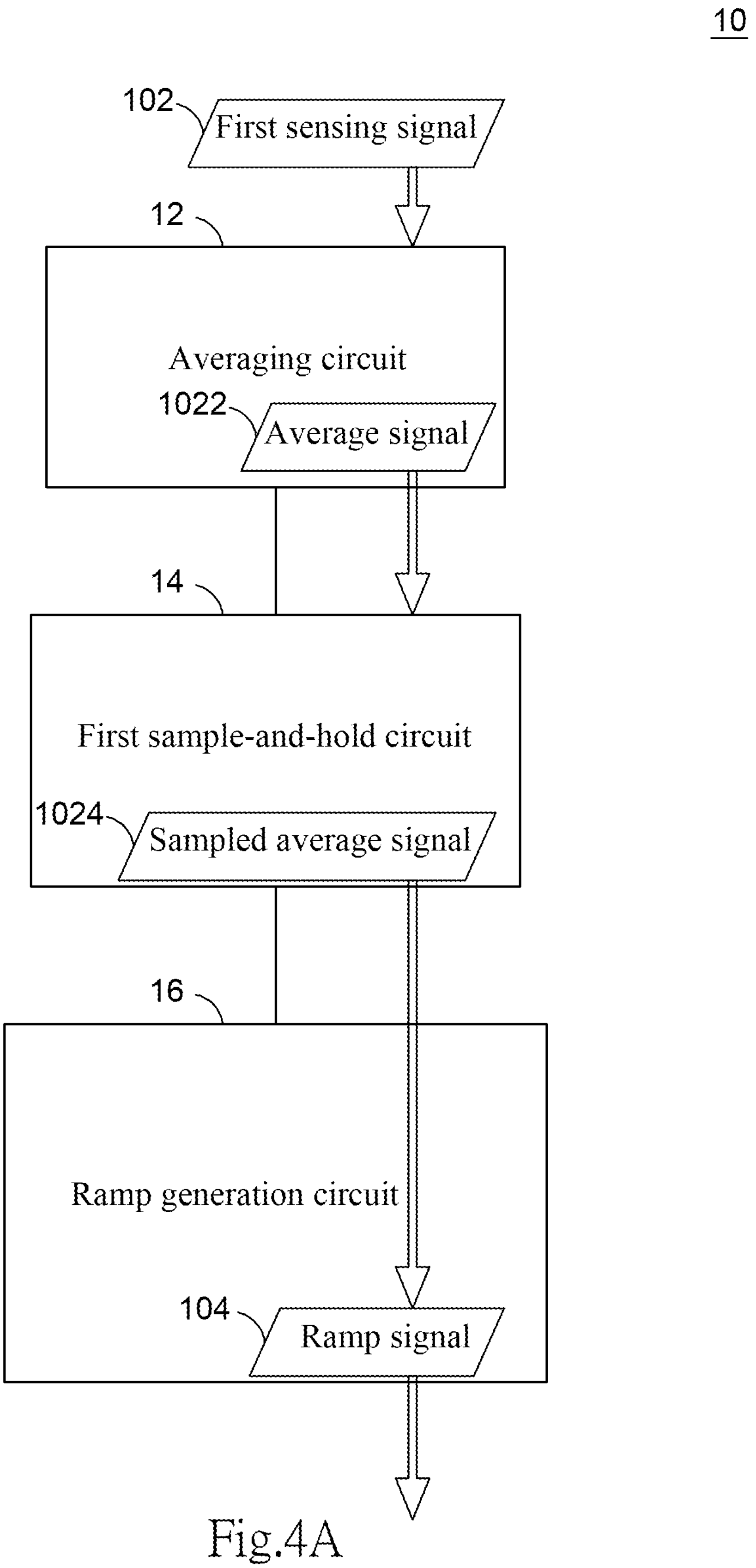
FIG. 4A shows a schematic diagram of signal transmission in the reference circuit according to an embodiment of the present invention.

First, please refer to FIG. 2 and FIG. 3. FIG. 2 shows a schematic diagram of the sensor circuit with noise elimination according to an embodiment of the present invention; FIG. 3 shows a schematic diagram of signal transmission according to an embodiment of the present invention. As shown in the figures, the present invention provides a sensor circuit with noise elimination 1, which comprises a reference circuit 10 and a comparison circuit 20. The reference circuit 10 receives a plurality of first sensing signals 102 and generates a ramp signal 104 according to the plurality of first sensing signals 102. The comparison circuit 20 is coupled to the reference circuit 10 and receives a second sensing signal 202 and the ramp signal 104. It then generates a count signal 292 according to the ramp signal 104 and the second sensing signal 202. When the ramp signal 104 and the second sensing signal 202 are equal, the count signal 292 is recorded Please refer to FIG. 4A, which shows a schematic diagram of signal transmission in the reference circuit according to an embodiment of the present invention. As shown in the figure, the reference circuit 10 includes an averaging circuit 12, a first sample-and-hold circuit 14, and a ramp generation circuit 16. The averaging circuit 12 receives and averages the plurality of first sensing signals 102 for generating an average signal 1022. The first sample-and-hold circuit 14 is coupled to the averaging circuit 12, samples and holds the average signal 1022 within a preset time, and generates a sampled average signal 1024. The ramp generation circuit 16 is coupled to the first sample-and-hold circuit 14 and generates the ramp signal 104 according to the sampled average signal 1024. The ramp signal 104 is a signal with a fixed slope added by the sampled average signal 1024.

Figure 4B:
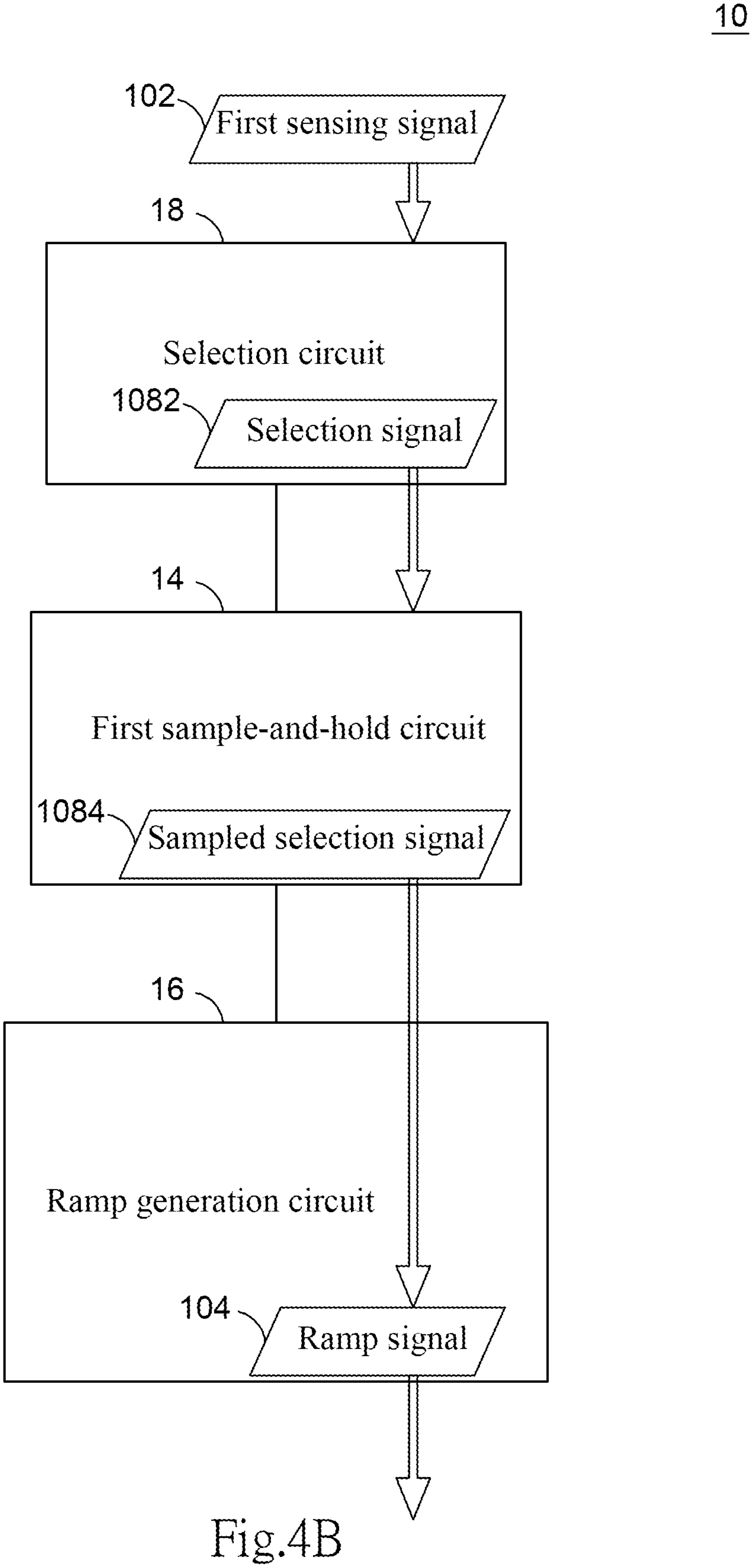
FIG. 4B shows another schematic diagram of signal transmission in the reference circuit according to an embodiment of the present invention.

Please refer to FIG. 4B, which shows another schematic diagram of signal transmission in the reference circuit according to an embodiment of the present invention. As shown in the figure, the reference circuit 10 includes a selection circuit 18, a first sample-and-hold circuit 14, and a ramp generation circuit 16. The selection circuit 18 receives and selects the plurality of first sensing signals 102 for generating a selection signal 1082. The first sample-and-hold circuit 14 is coupled to the selection circuit 18, samples and holds the selection signal 1082 within a preset time, and generates a sampled selection signal 1084. The ramp generation circuit 16 is coupled to the first sample-and-hold circuit 14 and generates the ramp signal 104 according to the sampled selection signal 1084. The ramp signal 104 is a signal with a fixed slope added by the sampled selection signal 1084.

Figure 5:
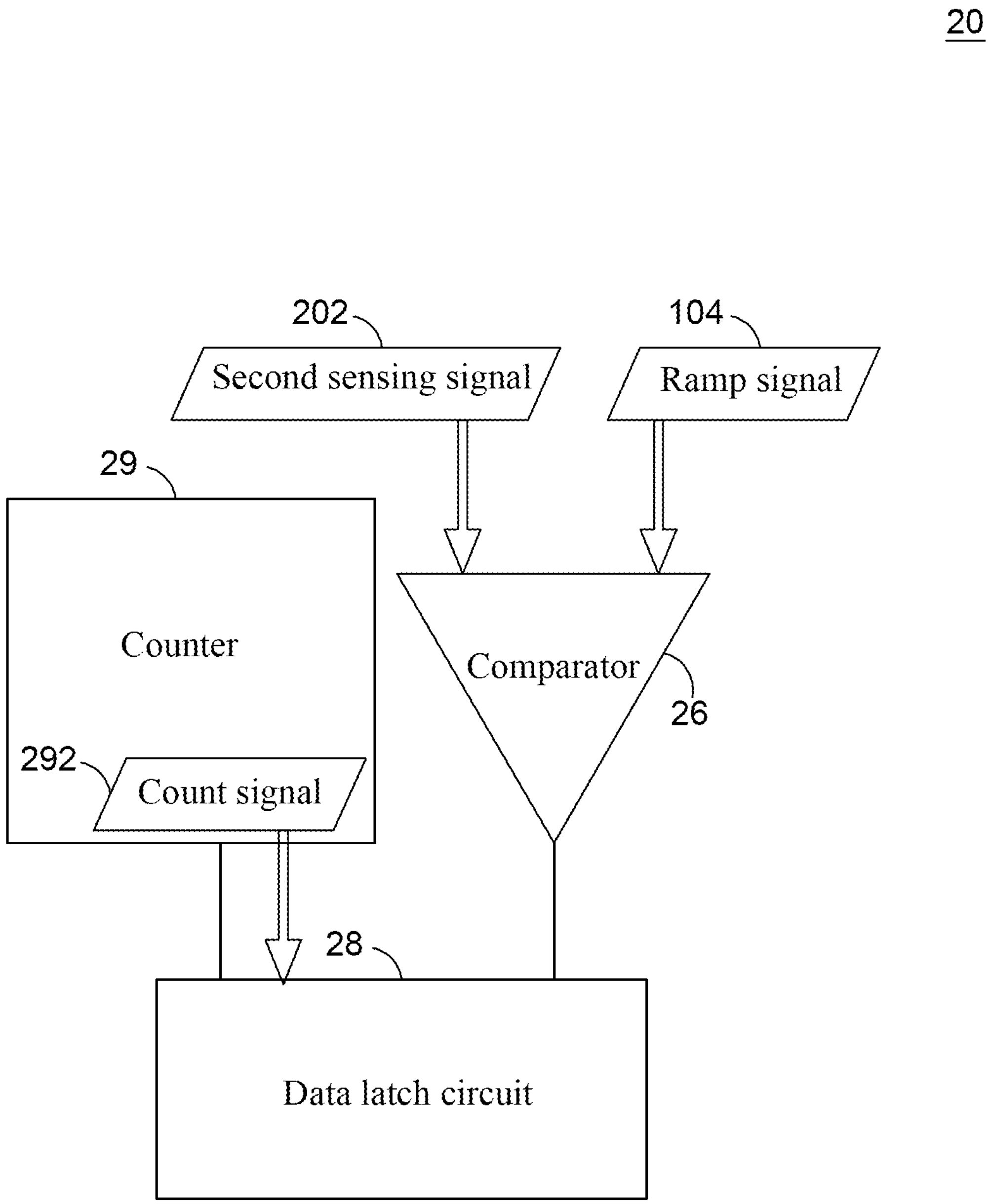
FIG. 5 shows a schematic diagram of signal transmission in the comparison circuit according to an embodiment of the present invention.

Please refer to FIG. 5, which shows a schematic diagram of signal transmission in the comparison circuit according to an embodiment of the present invention. As shown in the figure, a comparator 26 is used for comparing the ramp signal 104 and the second sensing signal 202. A counter 29 generates a count signal 292 corresponding to the ramp signal 104. A data latch circuit 28 is coupled to the comparator 26 and the counter 29, and records the count signal 292 when the comparator 26 judges that the ramp signal 104 is equal to the second sensing signal 202. The counter 29 starts to count when a voltage of the ramp signal 104 starts to fall.

Figure 6:
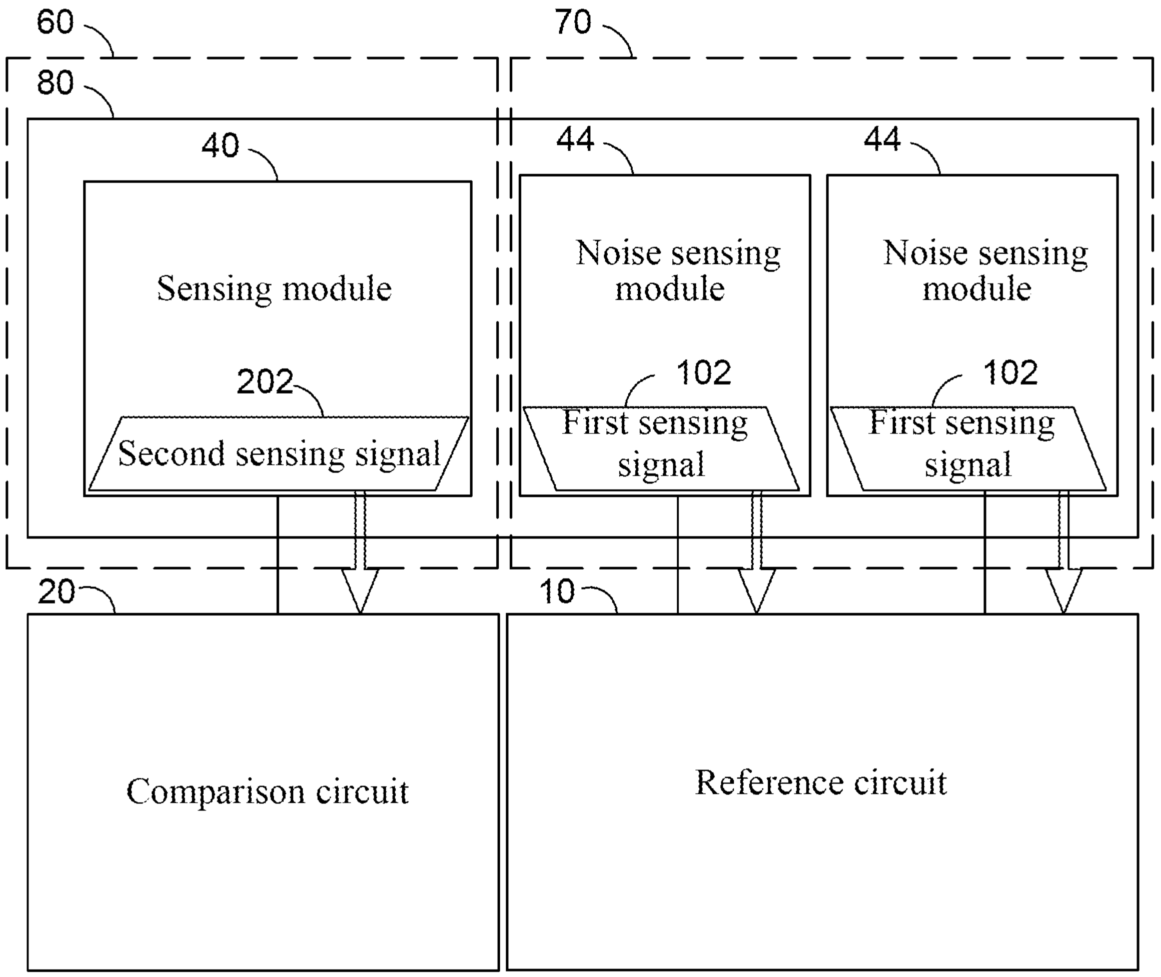
FIG. 6 shows a schematic diagram of the sensing module according to an embodiment of the present invention.

Please refer to FIG. 6, which shows a schematic diagram of the sensing module according to an embodiment of the present invention. As shown in the figure, a sensing module 40 is coupled to the comparison circuit 20 and senses a light signal and ambient light for generating the second sensing signal 202. A plurality of noise sensing modules 44 are disposed on one or more side of the sensing module 40 and coupled to the reference circuit 10. They sense the ambient light for generating the plurality of first sensing signals 102. The sensing module 40 and the plurality of noise sensing modules 44 are disposed on a substrate 80. The plurality of noise sensing modules 44 are disposed on are located in a fully covered sensing region 70 and sense the ambient noise and the power supply noise only. The sensing module 40 is located in an uncovered sensing region 60 for sensing the target, the ambient noise, and the power supply noise. In other words, the plurality of second sensing signals 202 include the sensing values of the target, the ambient noise, and the power supply noise.

Figure 7:
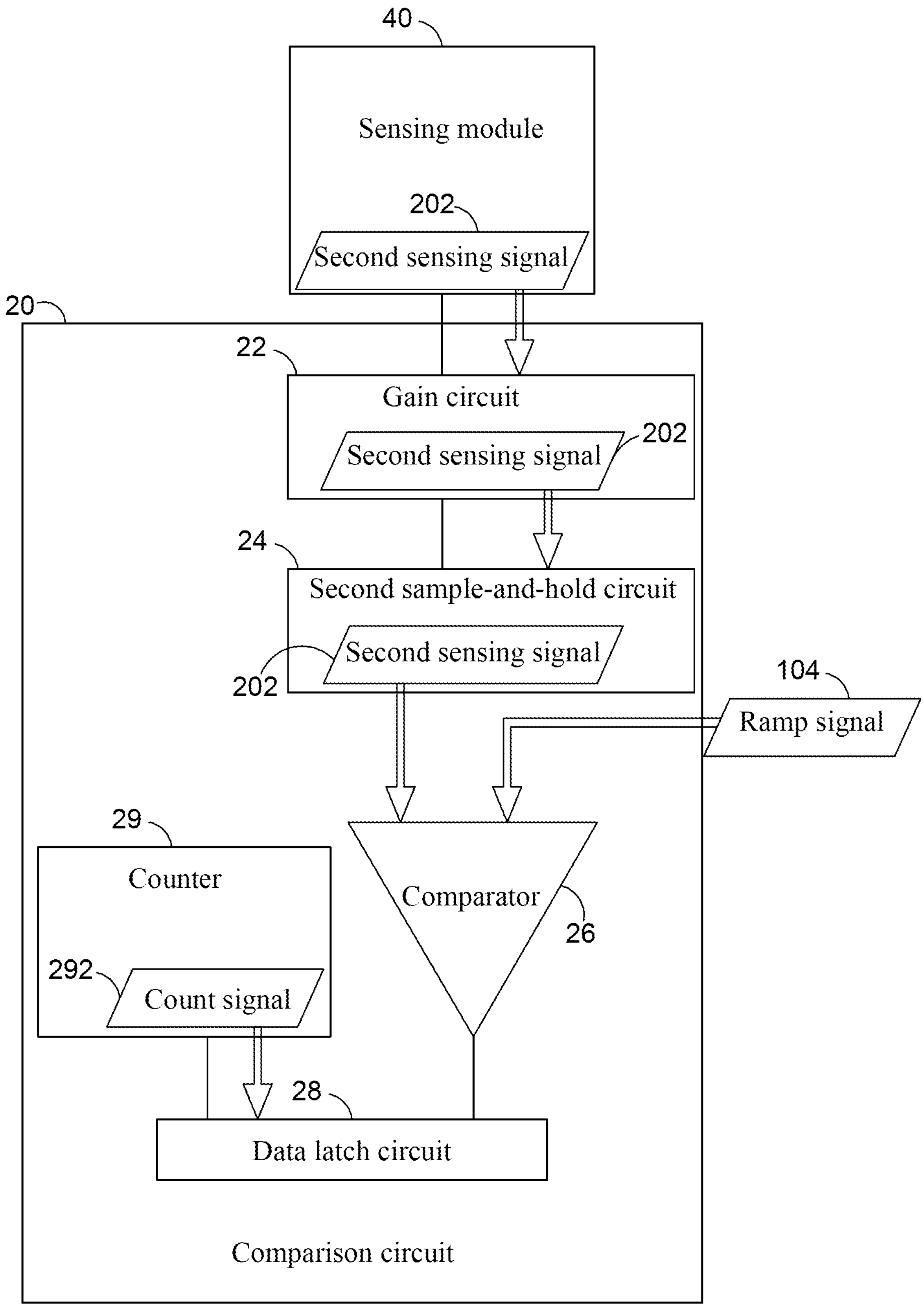
FIG. 7 shows another schematic diagram of signal transmission in the comparison circuit according to an embodiment of the present invention.

Please refer to FIG. 7, which shows another schematic diagram of signal transmission in the comparison circuit according to an embodiment of the present invention. As shown in the figure, a gain circuit 22 is coupled to the sensing module 40 and amplifies the power of the second sensing signal 202. A second sample-and-hold circuit 24 is coupled to the gain circuit 22, and samples and holds the second sensing signal 202. Then the stabler second sensing signal 202 can be provided to the comparator 20 for comparing with the ramp signal 104.

Figure 8A:
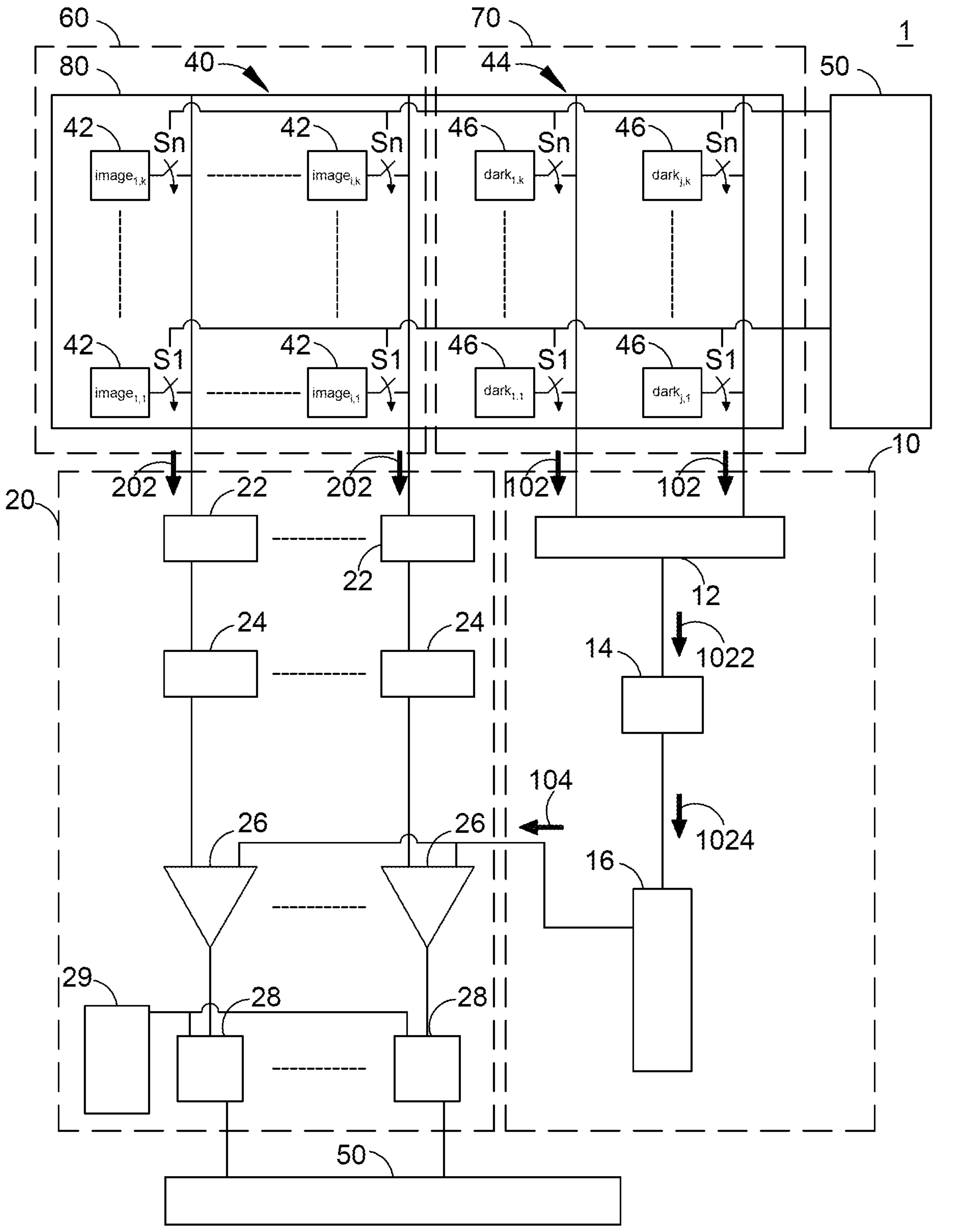
FIG. 8A shows a schematic diagram of the averaging circuit disposed in the sensor circuit according to another embodiment of the present invention.

Please refer to FIG. 3 to FIG. 8A. FIG. 8A shows a schematic diagram of the averaging circuit disposed in the sensor circuit according to another embodiment of the present invention. As shown in the figures, the sensing module 40 and the plurality of noise sensing modules 44 are coupled to a driving circuit 50, respectively. The driving circuit 50 generates a driving signal S1~Sn for controlling the sensing module 40 and the noise sensing modules 44 to sense. The sensing module 40 is located in the uncovered sensing region 60. The noise sensing modules 44 are located in the fully covered sensing region 70. In addition, the noise sensing modules 44 are located on one side of the sensing module 40. The noise sensing modules 44 include a plurality of noise pixel structures 46 for sensing the plurality of first sensing signals 102 after sensing the ambient light and transmitting the plurality of sensing signals 102 to the averaging circuit 12. The averaging circuit 12 receives and averages the plurality of first sensing signals 102, and generates and transmits the average signal 1022 to the first sample-and-hold circuit 14. The first sample-and-hold circuit 14 samples the average signal 1022 within the preset time and holds the average signal 1022 for generating and outputting the sampled average signal 1024 to the ramp generation circuit 16. The ramp generation circuit 16 generates the ramp signal 104 with a fixed slope. The ramp signal 104 is formed by adding a signal with a fixed slope to the sampled average signal 1024 and transmitted to the comparator 26.

Figure 8B:
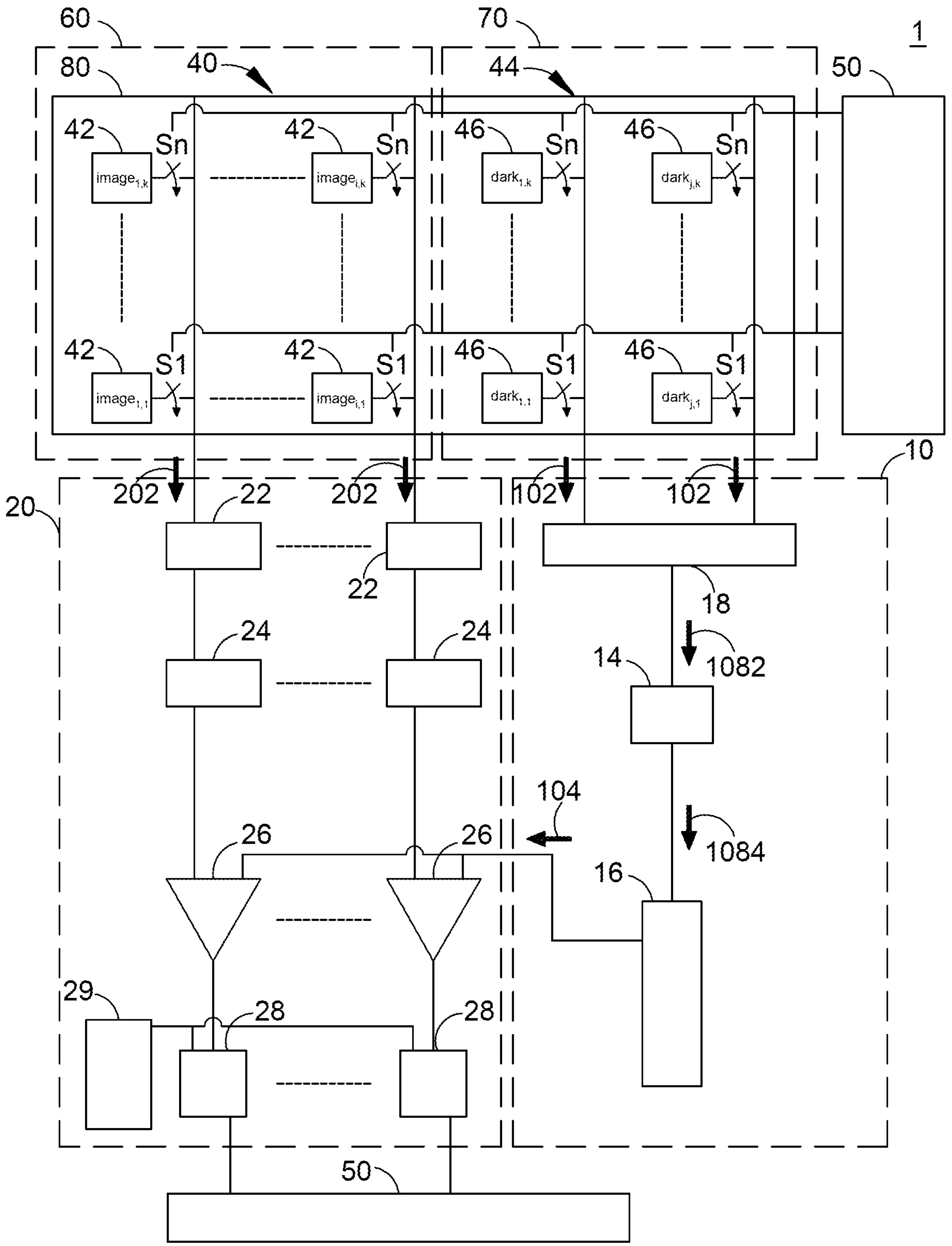
FIG. 8B shows a schematic diagram of the selection circuit disposed in the sensor circuit according to another embodiment of the present invention.

Furthermore, please refer to FIG. 8B. The difference between FIG. 8B and FIG. 8A is that, according to the present embodiment, the selection circuit 18 replaces the averaging circuit 12 in the previous embodiment for selecting the first sensing signal 102 and generating and transmitting the selection signal 1082 to the first sample-and-hold circuit 14. The first sample-and-hold circuit 14 samples the selection signal 1082 within the preset time and holds the selection signal 1082 for generating and outputting the sampled selection signal 1084 to the ramp generation circuit 16. The ramp generation circuit 16 generates the ramp signal 104 with a fixed slope. The ramp signal 104 is formed by adding a signal with a fixed slope to the sampled average signal 1024 and transmitted to the comparator 26. The connection and the corresponding signal transmission of the rest components are identical to the previous embodiment. Hence, the details will not be repeated.

Please refer to FIG. 8A and FIG. 8B again. The sensing module 40 includes the plurality of pixel structures 42 for sensing the light signal and the ambient light for generating and transmitting the second sensing signal 202 to the gain circuit 22. The gain circuit 22 amplifies the power of the second sensing signal 202 and transmits it to the second sample-and-hole circuit 24. The second sample-and-hole circuit 24 samples and holds the second sensing signal 202 within the preset time and transmits it to the comparator 26. The comparator 26 compares the second sensing signal 202 according to the ramp signal 104. The counter 29 starts to count when a voltage of the ramp signal 104 starts to fall. The data latch circuit 28 records the count signal 292 when the comparator 26 judges that the ramp signal 104 is equal to the second sensing signal 202 and deduces the sensing value of the light signal according to the count signal 292 and the ramp signal 104.

Figure 9:
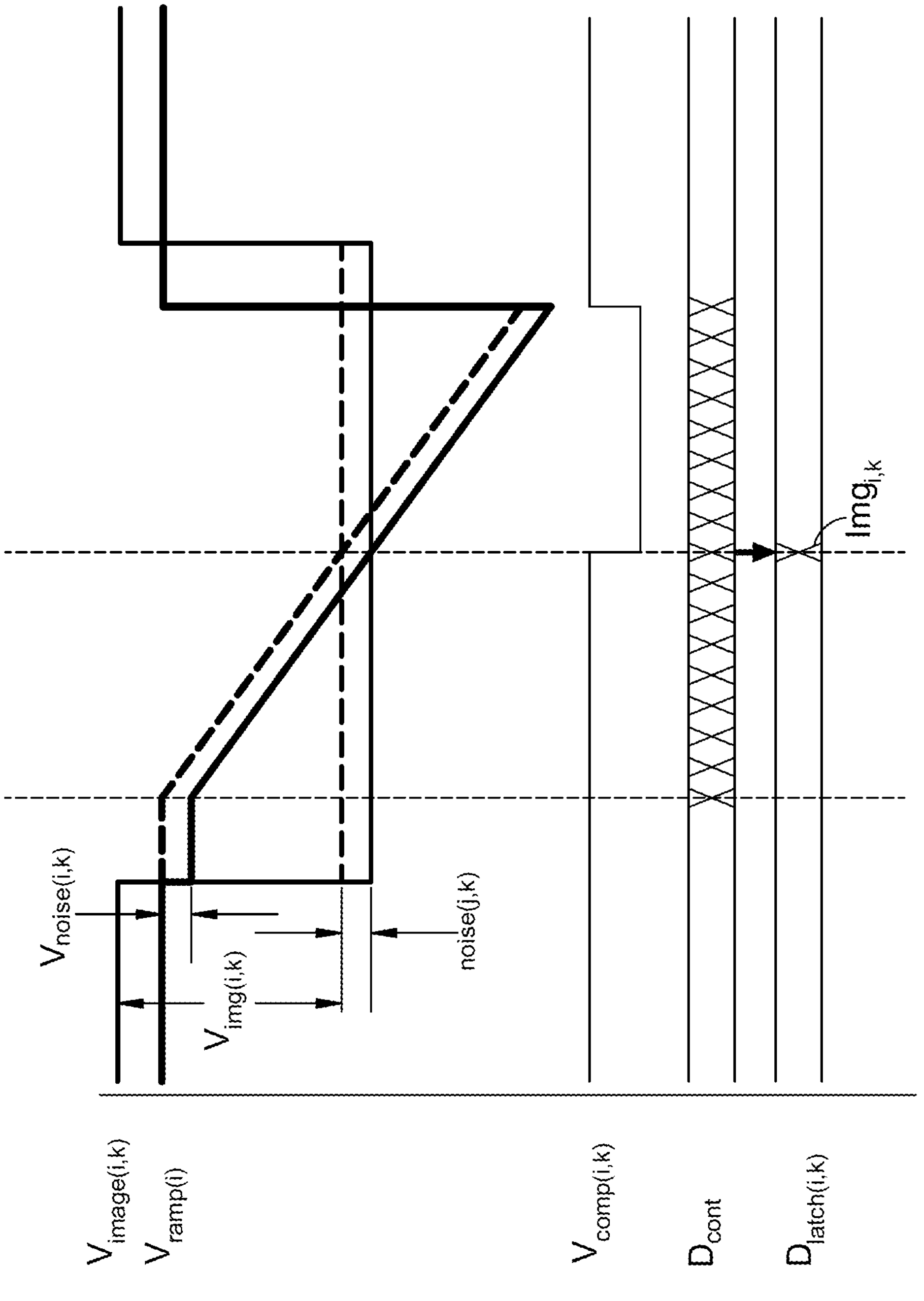
FIG. 9 shows a schematic diagram of the sensing values according to the present invention.

Please refer to FIG. 9, which shows a schematic diagram of the sensing values according to the present invention. As shown in the figure, $V_{ramp(i)}$ is the ramp signal 104 according to the present embodiment. $V_{image(i,k)}$ is the second sensing signal 202 of the pixel structure 42 of the (i,j) pixel according to the present embodiment. noise(i,k) is the first sensing signal 102 of the pixel structure 42 of the (i,j) pixel according to the present embodiment. $V_{ramp(i)}$ falls with time to make $V_{image(i,k)}=V_{ramp(i)}$. $V_{image(i,k)}$ is sampled. When the voltage difference is $V_{img}$, the noise is noise(i,k). The ramp signal 104 includes $V_{noise(i,k)}$, which is equivalent to noise (i,k). Thereby, the corresponding counting value $D_{cont}$ of the count signal 292 can be used to judge equality of the ramp signal 104 and the second sensing signal 202. When it occurs, the data latch circuit 28 latches the counting value $D_{cont}$ in the latch value $D_{latch(i,k)}$ and acting as the latched counting value $Img_{i,k}$. Next, the driving circuit 50 deduces the sensing value of the light signal according to the latched counting value $Img_{i,k}$. In other words, the sensing value $V_{image(i,k)}-V_{noise(i,k)}$ can be deduced and thus avoiding the influence of noise on the sensing values.

Figure 10:
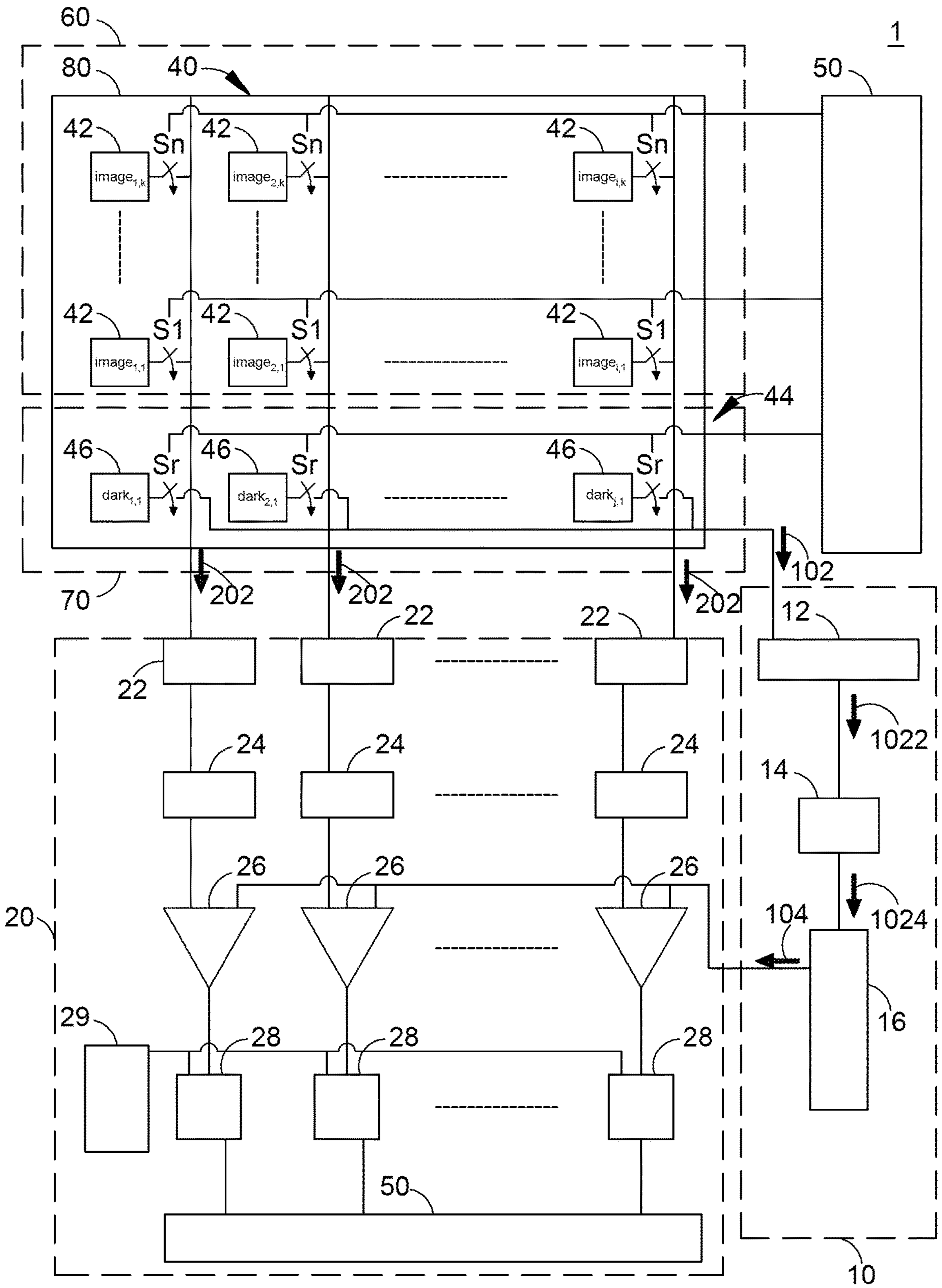
FIG. 10 shows a schematic diagram of the sensor circuit with noise elimination according to another embodiment of the present invention.

Please refer to FIG. 10, which shows a schematic diagram of the sensor circuit with noise elimination according to another embodiment of the present invention. The difference between FIG. 8A and FIG. 10 is that the noise sensing module 44 in FIG. 10 is located on the other side of the sensing module 40. For example, the noise sensing module 44 in FIG. 8A is disposed on the right side of the sensing module 40 while the noise sensing module 44 in FIG. 10 is disposed on the bottom side of the sensing module 40. The connection and the corresponding signal transmission of the rest components are identical to the previous embodiment. Hence, the details will not be repeated.

In addition, similar to the reference circuit 10 in FIG. 8B, the averaging circuit 12 in the reference circuit 10 in FIG. 10 can be replaced by the selection circuit 18. The connection and the corresponding signal transmission of the rest components are identical to the previous embodiment. Hence, the details will not be repeated. Moreover, the deduction of the sensing value of the light signal has been described previously. Hence, the details will not be repeated.

Figure 11:
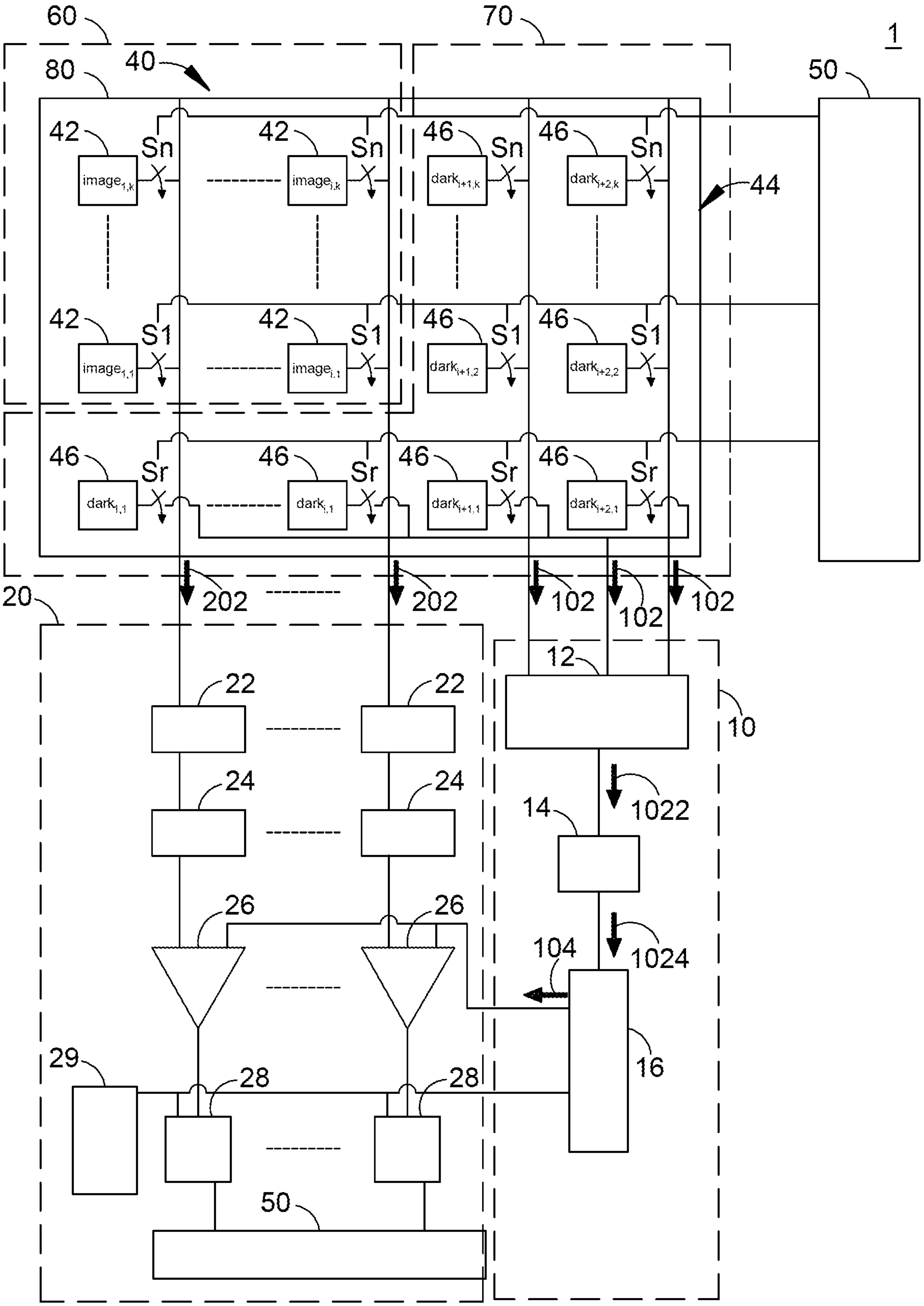
FIG. 11 shows a schematic diagram of the sensor circuit with noise elimination according to another embodiment of the present invention.

Please refer to FIG. 11, which shows a schematic diagram of the sensor circuit with noise elimination according to another embodiment of the present invention. The arrangement for the sensing module 44 and the noise sensing module 44 is different for FIG. 10 and FIG. 11. The noise sensing module 44 in FIG. 11 is disposed on two adjacent sides, for example the right side and the bottom side, of the sensing module 40. The connection and the corresponding signal transmission of the rest components are identical to the previous embodiment. Hence, the details will not be repeated.

Besides, similar to the reference circuit 10 in FIG. 8B, the averaging circuit 12 in the reference circuit 10 in FIG. 11 can be replaced by the selection circuit 18. The connection and the corresponding signal transmission of the rest components are identical to the previous embodiment. Hence, the details will not be repeated. Moreover, the deduction of the sensing value of the light signal has been described previously. Hence, the details will not be repeated.

Figure 12:
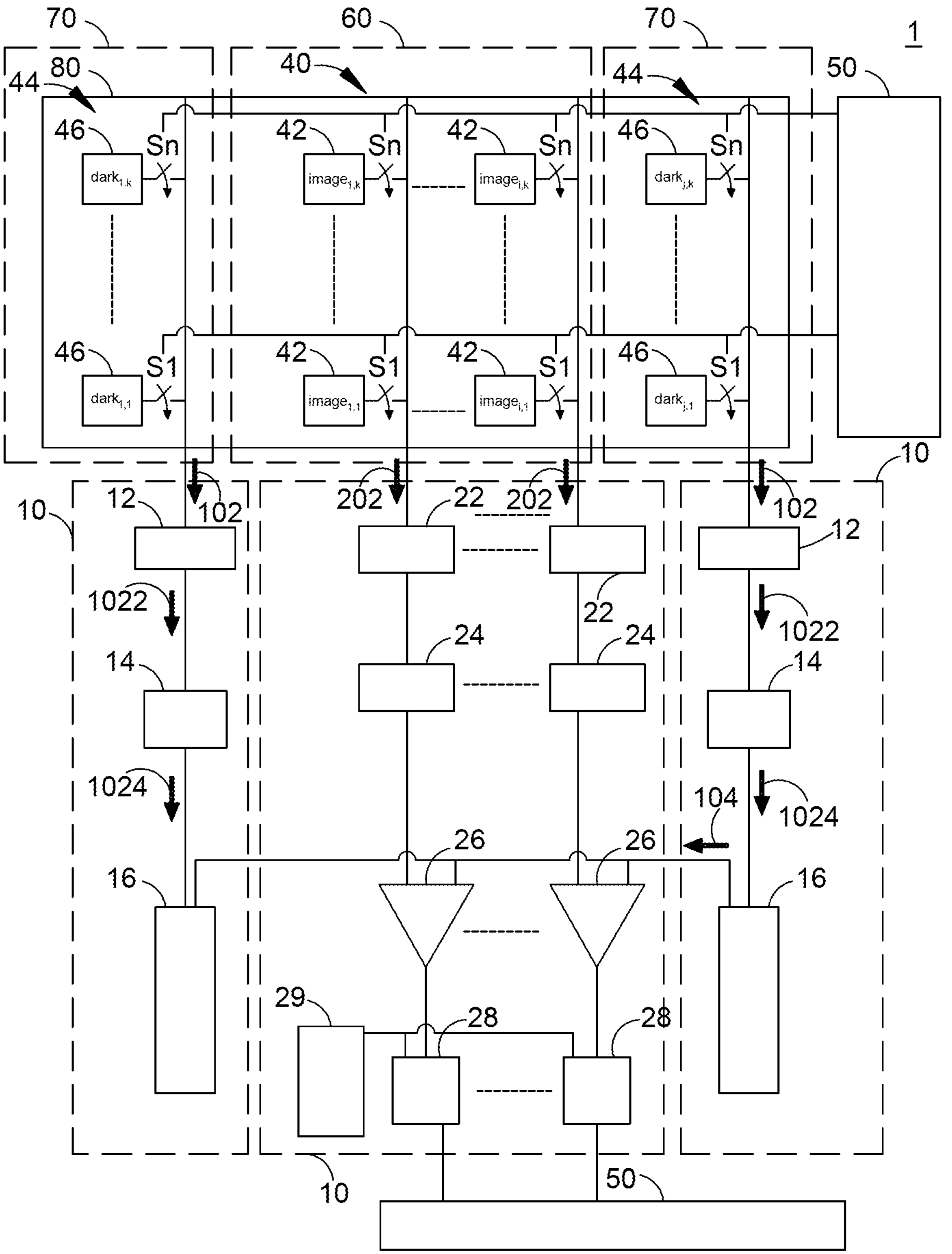
FIG. 12 shows a schematic diagram of the sensor circuit with noise elimination according to another embodiment of the present invention.

Please refer to FIG. 12, which shows a schematic diagram of the sensor circuit with noise elimination according to another embodiment of the present invention. The arrangement for the sensing module 44 and the noise sensing module 44 is different for FIG. 11 and FIG. 12. In particular, the noise sensing module 44 is divided to two regions and disposed on two sides of the sensing module 40. For example, the noise sensing module 44 according to the present embodiment is disposed on the left and the right sides of the sensing module 40. In other words, the noise sensing module 44 receives the driving signals S1~Sn of the driving circuit 50 by columns. Alternatively, the noise sensing module 44 can be disposed on the top and the bottom sides of the sensing module 40. That is to say, the noise sensing module 44 receives the driving signals S1~Sn of the driving circuit 50 by rows. The connection and the corresponding signal transmission of the rest components are identical to the previous embodiment. Hence, the details will not be repeated.

Besides, similar to the reference circuit 10 in FIG. 8B, the averaging circuit 12 in the reference circuit 10 in FIG. 12 can be replaced by the selection circuit 18. The connection and the corresponding signal transmission of the rest components are identical to the previous embodiment. Hence, the details will not be repeated. Moreover, the deduction of the sensing value of the light signal has been described previously. Hence, the details will not be repeated.

The present invention provides a sensor circuit with noise elimination. The reference circuit is used for receiving the sensing signal with noise only. The comparison circuit is coupled to the reference circuit and compares the sensing signal with noise only and the one with sensing value and noise for deducing the sensing value of light. Thereby, the noise in the sensing signal can be eliminated and giving the sensing value without noise. Since both sensing values contain deviation information caused by manufacturing, the deviation information can be eliminated.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A sensor circuit with noise elimination, comprising:

a reference circuit, receiving a plurality of first sensing signals, and generating a ramp signal according to said plurality of first sensing signals, said reference circuit comprising:

an averaging circuit, receiving and averaging said plurality of first sensing signals, and generating an average signal;

a first sample-and-hold circuit, coupled to said averaging circuit, sampling said average signal, and generating a sampled average signal; and a ramp generation circuit, coupled to said first sample-and-hold circuit, and generating said ramp signal according to said sampled average signal;

a comparison circuit, coupled to said reference circuit, receiving a second sensing signal and said ramp signal, generating a count signal according to said ramp signal and said second sensing signal, and recording a counting value of said count signal when a signal value of said ramp signal is equal to a signal value of said second sensing signal in comparing said ramp signal with said second sensing signal;

a sensing module, coupled to said comparison circuit, sensing a light signal and an ambient light, and generating said second sensing signal corresponding to said light signal and said ambient light; and a plurality of noise sensing modules, disposed on one or more side of said sensing module and coupled to said reference circuit, sensing said ambient light, and generating said plurality of first sensing signals corresponding to said ambient light;

wherein said comparison circuit obtains a sensing value of said light signal according to said signal value of said ramp signal corresponding to said counting value of said recorded count signal.

2. The sensor circuit with noise elimination of claim 1, wherein said comparison circuit includes:

a comparator, used for comparing said ramp signal and said second sensing signal;

a counter, generating a count signal corresponding to said ramp signal; and a data latch circuit, coupled to said comparator and said counter, and recording said counting value of said count signal when said comparator judges that said ramp signal is equal to said second sensing signal.

3. The sensor circuit with noise elimination of claim 1, wherein said comparison circuit further includes:

a gain circuit, coupled to said sensing module, and amplifying the power of said second sensing signal; and a second sample-and-hold circuit, coupled to said gain circuit, sampling and holding said second sensing signal, and transmitting said sampled second sensing signal to said comparator.

4. The sensor circuit with noise elimination of claim 1, wherein said plurality of noise sensing modules are disposed on two adjacent sides of said sensing module.

5. The sensor circuit with noise elimination of claim 1, wherein said plurality of noise sensing modules are disposed on two opposing sides of said sensing module.

6. The sensor circuit with noise elimination of claim 1, wherein said sensing module further includes a plurality of pixel structures with each pixel structure including a transistor.

7. The sensor circuit with noise elimination of claim 1, wherein said sensing module and said plurality of noise sensing modules are coupled to a driving circuit, respectively; and said driving circuit generates a driving signal for controlling said sensing module and said plurality of noise sensing modules to perform sensing.

8. A sensor circuit with noise elimination, comprising:

a reference circuit, receiving a plurality of first sensing signals, and generating a ramp signal according to said plurality of first sensing signals, said reference circuit comprising:

a selection circuit, receiving and selecting said plurality of first sensing signals, and generating a selection signal;

a first sample-and-hold circuit, coupled to said selection circuit, sampling said selection signal, and generating a sampled selection signal; and a ramp generation circuit, coupled to said first sample-and-hold circuit, and generating said ramp signal according to said sampled selection signal;

a comparison circuit, coupled to said reference circuit, receiving a second sensing signal and said ramp signal, generating a count signal according to said ramp signal and said second sensing signal, and recording a counting value of said count signal when a signal value of said ramp signal is equal to a signal value of said second sensing signal in comparing said ramp signal with said second sensing signal;

a sensing module, coupled to said comparison circuit, sensing a light signal and an ambient light, and generating said second sensing signal corresponding to said light signal and said ambient light; and a plurality of noise sensing modules, disposed on one or more side of said sensing module and coupled to said reference circuit, sensing said ambient light, and generating said plurality of first sensing signals corresponding to said ambient light;

wherein said comparison circuit obtains a sensing value of said light signal according to said counting value of said recorded count signal and said signal value of said ramp signal.

9. The sensor circuit with noise elimination of claim 8, wherein said comparison circuit includes:

a comparator, used for comparing said ramp signal and said second sensing signal;

a counter, generating a count signal corresponding to said ramp signal; and a data latch circuit, coupled to said comparator and said counter, and recording said counting value of said count signal when said comparator judges that said ramp signal is equal to said second sensing signal.

10. The sensor circuit with noise elimination of claim 8, wherein said comparison circuit further includes:

a gain circuit, coupled to said sensing module, and amplifying the power of said second sensing signal; and a second sample-and-hold circuit, coupled to said gain circuit, sampling and holding said second sensing signal, and transmitting said sampled second sensing signal to said comparator.

11. The sensor circuit with noise elimination of claim 8, wherein said plurality of noise sensing modules are disposed on two adjacent sides of said sensing module.

12. The sensor circuit with noise elimination of claim 8, wherein said plurality of noise sensing modules are disposed on two opposing sides of said sensing module.

13. The sensor circuit with noise elimination of claim 8, wherein said sensing module further includes a plurality of pixel structures with each pixel structure including a transistor.

14. The sensor circuit with noise elimination of claim 8, wherein said sensing module and said plurality of noise sensing modules are coupled to a driving circuit, respectively; and said driving circuit generates a driving signal for controlling said sensing module and said plurality of noise sensing modules to perform sensing.

* * * * *